(12) United States Patent
Wu et al.

(10) Patent No.: US 7,453,992 B2
(45) Date of Patent: Nov. 18, 2008

(54) SYSTEM AND METHOD FOR MANAGEMENT OF CALL DATA USING A VECTOR BASED MODEL AND RELATIONAL DATA STRUCTURE

(75) Inventors: Cheng Wu, Mount Kisco, NY (US);
Andrzej Sakrajda, White Plains, NY (US); Hong-Kwang Jeff Kuo, Pleasantville, NY (US); Vaibhava Goel, Elmsford, NY (US); David Lubensky, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 11/106,169

(22) Filed: Apr. 14, 2005

(65) Prior Publication Data
US 2006/0233325 A1    Oct. 19, 2006

(51) Int. Cl.
*H04M 11/06* (2006.01)
(52) U.S. Cl. .................. 379/88.13; 379/85; 706/62; 709/219; 714/32
(58) Field of Classification Search .............. 379/88.17, 379/85, 88.13; 711/108; 706/62; 709/219; 714/32
See application file for complete search history.

(56) References Cited

U.S. PATENT DOCUMENTS 6,263,051 B1 * 7/2001 Saylor et al. ............. 379/88.17
6,983,345 B2 * 1/2006 Lapir et al. ................. 711/108

OTHER PUBLICATIONS

Paul J. Morris, "Relational Database Design and Implementation for Biodiversity Informatics", The Academy of Natural Sciences, Philadelphia, PA; Jun. 2004; 53 pages.

* cited by examiner

*Primary Examiner*—Gerald Gauthier
(74) *Attorney, Agent, or Firm*—Keusey, Tutunjian & Bitetto, P.C.

(57) ABSTRACT

A system and method for representing call content in a searchable database includes transcribing call content to text. The call content is projected to vector space, by creating a vector by indexing the call based on the content and determining a similarity of the call to an atomic-class dictionary. The call is classified in a relational database in accordance with the vector.

21 Claims, 5 Drawing Sheets

SYSTEM AND METHOD FOR MANAGEMENT OF CALL DATA USING A VECTOR BASED MODEL AND RELATIONAL DATA STRUCTURE

BACKGROUND

1. Technical Field

The present invention relates systems and methods for managing data and more particularly to a relational data structure and a method for optimizing a database and call data searching for achieving better performance in retrieving, reviewing and processing recorded calls in, e.g., an enterprise call center environment.

2. Description of the Related Art

Voice activated self-service applications use call data. More specifically, the performance and cost of a voice-based solution depends on how call data is managed. Call data, generally speaking, includes call recording (audio), call transcribed test, and control data (e.g., such as Caller ID, Call disposition, etc.) associated with a call.

Most recording systems in call centers are telephone systems configured to only offer recording of some or all calls with searching available only by date, time and dialed number. The structure of stored data is practically meaningless.

It is extremely difficult or impossible to enable easy access, selection, retrieval and processing of any call data (content) that may be needed by researchers, developers, analysts, etc. based on call content, classification and statistical features. The speed of access to call recordings deposited in a database is usually important. Basic concerns about the speed of access for call retrieving are relevant to the database connection, Structured Query Language (SQL) query and how to manage the source or destination of local data.

In the case of a call center with a large recorded call volume, the SQL query plays a major role that influences the speed of performance. Two areas which may be considered in designing a call data repository include transactional guarantees and querying capabilities. Transactional guarantees refers to the reliable storage of call data, and the querying capability focuses on how to achieve easy retrieval, review, and archival of the data, none of which can be ignored.

To efficiently use a database, the database design should avoid needless expense. One important part of the data structure design includes a data table structure design, which can sometimes contribute greatly to improved performance. For example, if there are over 300,000 call data stored in a database, it takes minutes to search how many calls asked for a customer service representative (CSR) and to pick up the top ten most typical sentences asking for the CSR. Currently, existing data structures do not provide such capabilities or it may presently be impossible for conventional system to perform such operations.

Since no knowledge representation of call data is available on databases now, no applications can share the knowledge at the database level, and presently no data processing efforts (which are typically very costly procedures) can make this data reusable.

SUMMARY

A system and method for representing call content in a searchable database includes transcribing call content to text. The call content is projected to vector space, by creating a vector by indexing the call based on the content and determining a similarity of the call to an atomic-class dictionary. The call is classified in a relational database in accordance with the vector.

A system for representing call content in a searchable database includes a management module, which receives call content from a source. The management module includes a relational data structure employed for indexing call content and classifying call content for converting the call content into a vector. A content index dictionary provides information for creating the call content indexing, and an atomic-class dictionary is employed to classify the call content. A database stores the converted vectors to provide searchable call content.

A representation of call data is described by using content knowledge based relational data structure that can be used for efficient retrieving and mining of call data at the database level in the speech adaptation, call classification, call analytical areas.

One method collects incoming calls from source channels (e.g., telephony channels or file systems) and transcribes the content of calls, e.g., based on user's rules or business logic. Final call destination or content may be used to automatically classify the call. The call content data is converted into vector space, and the classified call data is written using the relational data set structure to a target database.

The relational data set structure employs database call records and two dictionaries, which can represent a call by using a vector space model. The vector space model can easily give the frequency description of each word or phrase in the call and the classification hierarchy description of call recordings in a target database. The frequency of a word or phrase and the classification hierarchy tree of call data can be automatically updated without any changes to the records of existing call data in the database when a new call is added to the database. Automatically classified call data in the database will provide huge savings in the effort needed for data processing and for any related further application developments.

Another method includes using a knowledge based data structure in a database for demonstrating the call data with a relational hierarchy tree and the automatic re-classifying apparatus integrated with call business logic to assist human annotators on natural language understanding (NLU) tasks. An efficient call content knowledge based data organizing method enables reusable and efficient retrievable processed data assets stored in a database, which can save significant initial data processing efforts for different working purposes.

The incoming calls may include any representation of data including audio, images, video, text, featured information through the relational data structure described by a statistic method in a database for efficiently classifying, mining, retrieving and understanding processing.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFFERED EMBODIMENTS

Figure 1:
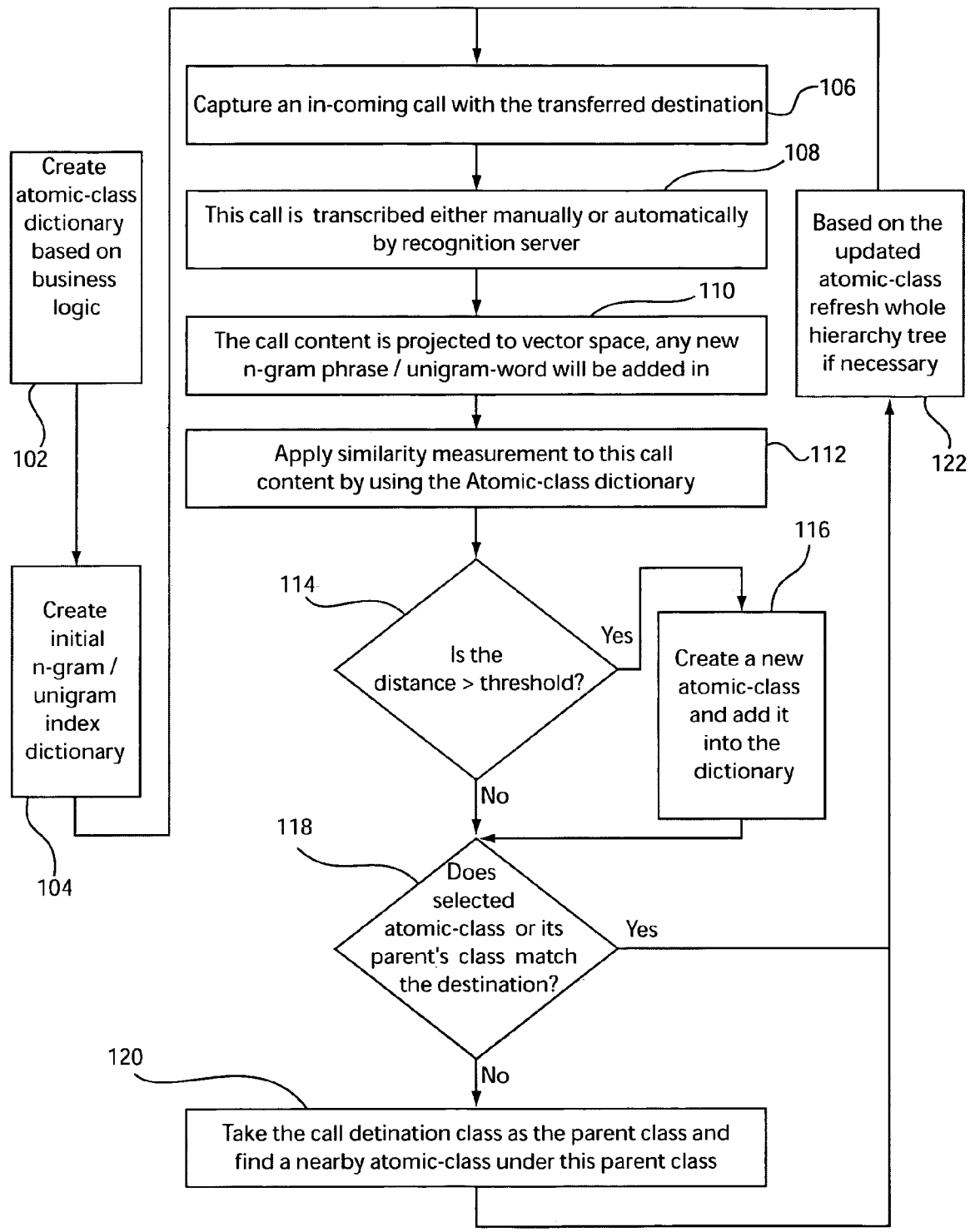
FIG. 1 is a block/flow diagram showing a system/method for classifying call content for creating a searchable database of call content in accordance with one illustrative embodiment.

In useful embodiments, representations of data including audio, images, video, text, featured information through a relational data structure is described by a statistic method at the database level for efficiently using data. Specifically, a relational data structure provides a representation of call data with content knowledge analytics at the database level.

The present invention provides embodiments which target a relational data table design of the database used for storing in-coming calls and provide an optimized data table structure in both text and vector space models for retrieving, reviewing and processing calls. This is particularly useful for Natural Language Understanding (NLU) types of self-service applications, call information retrieval and call mining applications.

In one embodiment, the relational data set structure employs a database table and two dictionaries, which represent a call into a vector space model, which can easily give the frequency description of each word or phrase in the call and classification hierarchy description of call recordings in the database. Such knowledge based data organizing enables a fast database access for on-line information retrieval-type applications by using the contents of the call(s).

Some advantages may include the following. Frequency of use of a word or phrase and the classification hierarchy of a call can be automatically updated without any changes of the records of existing calls in the database when a new call is added to the database. Well-classified call recordings in the database will bring huge performance improvements for applications, which need on-line database access.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

It should also be understood that embodiments will be described in terms of illustrative examples. Some of these examples will employ terms, which are herein described. For example, a call content index dictionary may include a lookup table, which combines all unique words (unigrams) and phrases (n-grams) as well as the frequency of each word and phrase. An atomic-class is defined as the smallest group of sentences with certain similarity, and it cannot be further split. An atomic-class dictionary includes a single entry for each class, and each class is described as a combination of keywords or meaning, a parent's class hierarchy tree, central vector and the number of vectors belonging to this atomic-class. The entry index can be easily remapped to have a new atomic-class or parent's class without changing the actual atomic-class identification (ID) of a call in the database.

A call record may include a record in the database to describe a call. It may include call ID, call content, confidence score, call vector, atomic-class ID, destination agents, data attribute, etc. Supported by call content index and atomic-class dictionaries, a call record represents call data in the database with content related knowledge information through a relational data structure.

Referring now to the drawings in which like numerals represent the same or similar elements and initially to FIG. 1, a block/flow diagram illustratively shows a system/method using vector based models and relational data structure. In block 102, an atomic-class dictionary is created based on business logic or other logic depending on the application of the call system, e.g. logic may be used for call routing applications based on a call destination map. In block 104, an initial content index dictionary is created based on unique n-gram phrases and unigram words from domain knowledge.

In block 106, an in-coming call is captured from, e.g., a call center field or from a local file system with a call transferred destination, if available. In block 108, the call is transcribed by human (manually) or by a speech recognition server. Transcription includes converting the audio/visual information into a digital format. In block 110, the content of the call is projected to a vector space model(s) by using a content index dictionary. Any new n-gram phrases and unigram words will be added into content dictionary and any stop words will be filled out. Stop words are common words that are ignored when you build models. So the content dictionary has only the list of unique key words, words like, e.g., a, the, for, etc. will not be included.

In block 112, a similarity measurement is applied to the call vector based on the atomic-class dictionary. Each atomic-class has a center or reference from which a distance can be measured. In block 114, if the minimum distance between the call vector and the atomic-class is greater than a pre-set threshold, go to block 116, otherwise go to block 118.

In block 116, a new atomic-class is created for the call vector and added into atomic-class dictionary. Then, the program goes to block 118. In block 118, if the call transferred destination is available, determine whether a parent class of the selected atomic-class for this call vector matches the call transferred destination. If the call vector matches the call-transferred destination, go to block 122, otherwise go to block 120.

In block 120, the parent class which matches the call transferred destination class is taken as the new parent class and a nearest atomic-class under this new parent class is found for this call vector.

In block 122, based on updated atomic-class, refresh whole hierarchy tree including the center of an atomic-class and the number of vectors under an atomic-class on atomic-class dictionary. Then the path returns to block 106 and takes another call recording.

Figure 2:
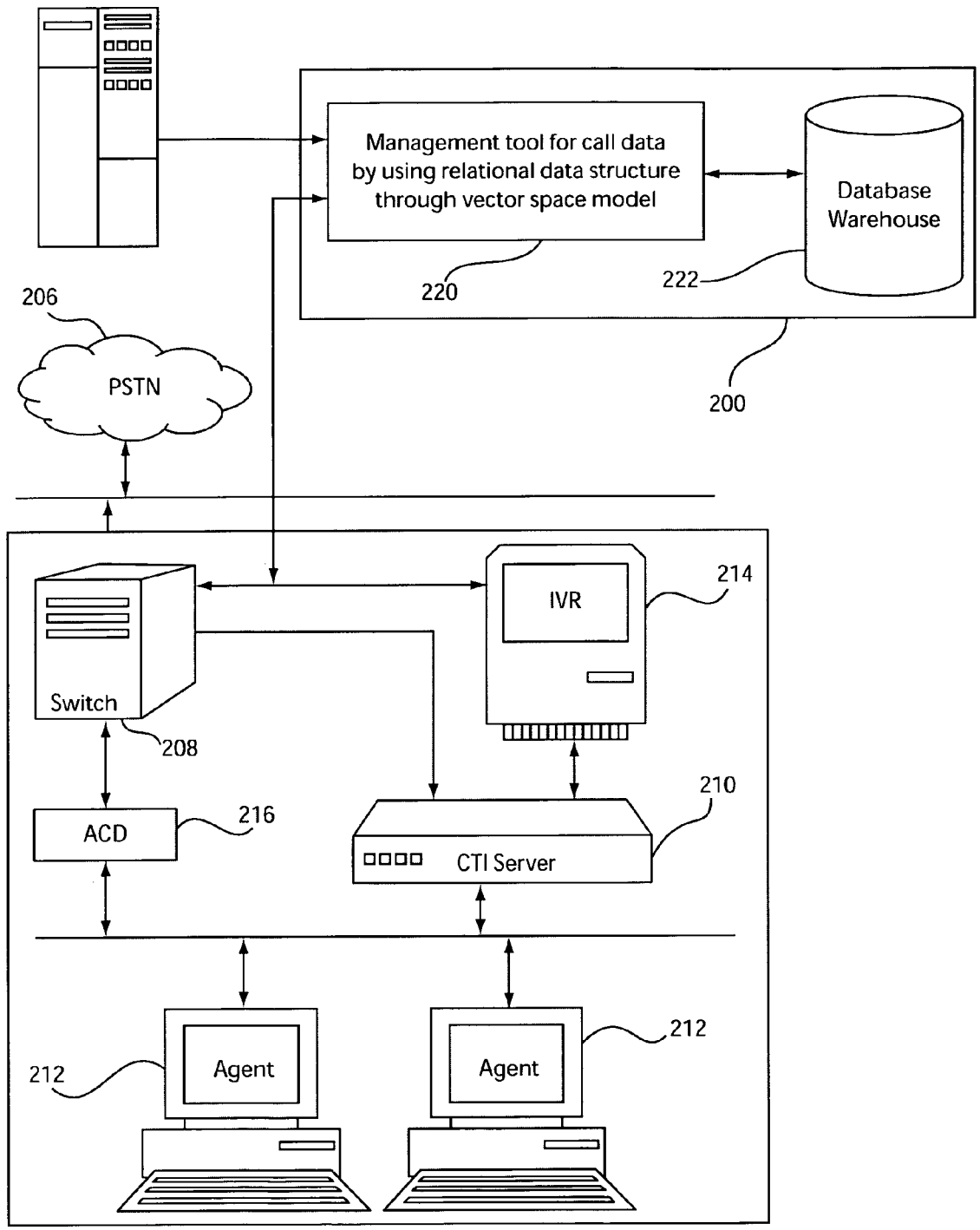
FIG. 2 is a block diagram showing a system having a management tool/module for classifying call content for creating a searchable database of call content in accordance with an illustrative embodiment.

Referring to FIG. 2, a block diagram of an exemplary system 200 for using vector models for managing call content is illustratively shown. Call recordings may be processed from an enterprise call center 202 directly or from a local file system 204 where call recordings are stored. A database based efficient retrieving and mining services for call data is provided, which receives calls from a network 206, e.g., a publicly switched telephone network (PSTN), a local area network, a cable network, satellite network, a cellular network, or any other network.

Enterprise call center 202 may include a plurality of different configurations. One illustrative configuration is shown in FIG. 2. Center 202 may include a switch 208, which selects channel assignments or otherwise provides management of channels for incoming calls from the network 206. A Computer Telephony Integration (CTI) server 210 assigns incoming calls to agents 212, interactive voice response (IVR) systems 214, automatic call distribution systems (ACD) 216 or any other destination or equipment employed in a call center.

It is to be understood that the call center may be as small a simple switchboard or as large as a full-scale call facility capable or receiving millions of calls or more daily. This system can easily be scaled by providing sufficient capability using system 200.

System 200 includes a management tool 220, which performs operations as described with reference to FIG. 1. Management tool 220 includes a relational data structure or data structures, which may be hierarchically arranged through vector space. Calls received are recorded and decoded or decoded in real-time be tool 220. A database or file system 204 may be employed to store incoming calls. Tool 220 targets a relational data table design of database 218, which is used for storing in-coming calls. Tool 220 provides an optimized representation of call data in a relational data structure using vector space models to represent call contents.

This may be provided by providing a relational hierarchy tree for call contents across an entire data set. This type of database level classification information makes it possible for self-service, call information retrieval and call mining type applications to easily retrieve, review and process calls efficiently. The hierarchy tree for classifying calls and storing the calls in vector space are stored in a database warehouse 222. Database 222 advantageously provides a searchable database of calls, which can be used to find a call or all calls classified based on topic or content.

In one embodiment, all database record tables are created by using text format database scripts. A full structured query language (SQL) query to database 222 will bring back a database record or records, which satisfy the query. Confidence scores and other known features may be provided to enhance the quality and usefulness of the search and the searching tools.

Figure 3:
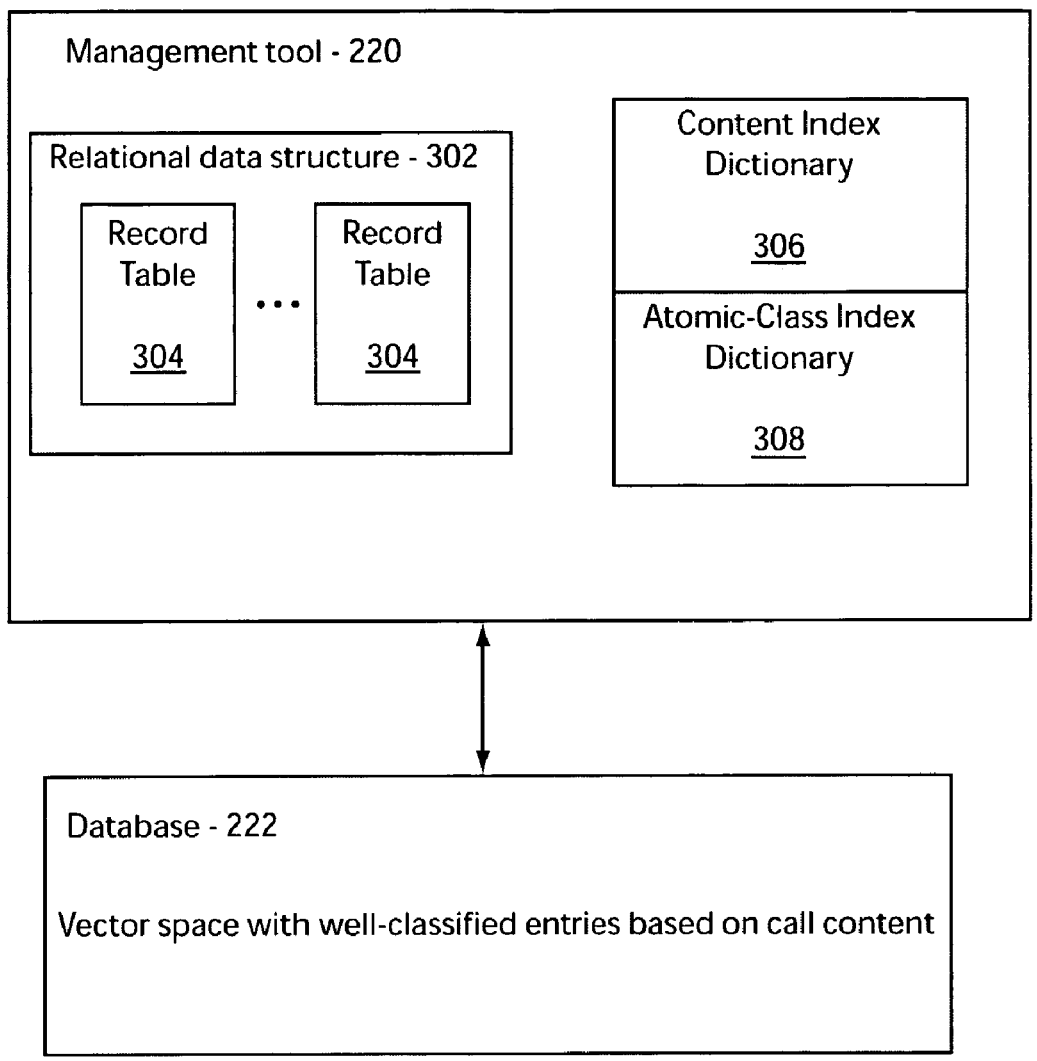
FIG. 3 is a block diagram showing the management tool/module of FIG. 2 in greater detail.

Referring to FIG. 3, tool 220 and database 222 are shown in greater detail for a particularly useful embodiment. Tool 220 includes a relational data set structure 302, which employs database record tables 304 and at least two dictionaries 306 and 308. One dictionary includes a content index dictionary 306.

Content index dictionary 306 gives the frequency description of a word or phrase for a given data set. Another dictionary includes an atomic-class dictionary 308, which gives classification hierarchy descriptions of call data stored in the database. Frequencies of a word or phrase and the classification hierarchy tree of call data can be automatically updated without modifying any existing database records when a new call is added to the database. This is due in part to the vector space and relational database design provided. Well-classified call data in the database 222 will result is substantial performance improvement for applications, which need efficient database access.

Optimized self-clustering methodology may be employed by tool 220 for call data analytics at the database level without the need of manually classifying call data in the call center, for example.

Figure 4:
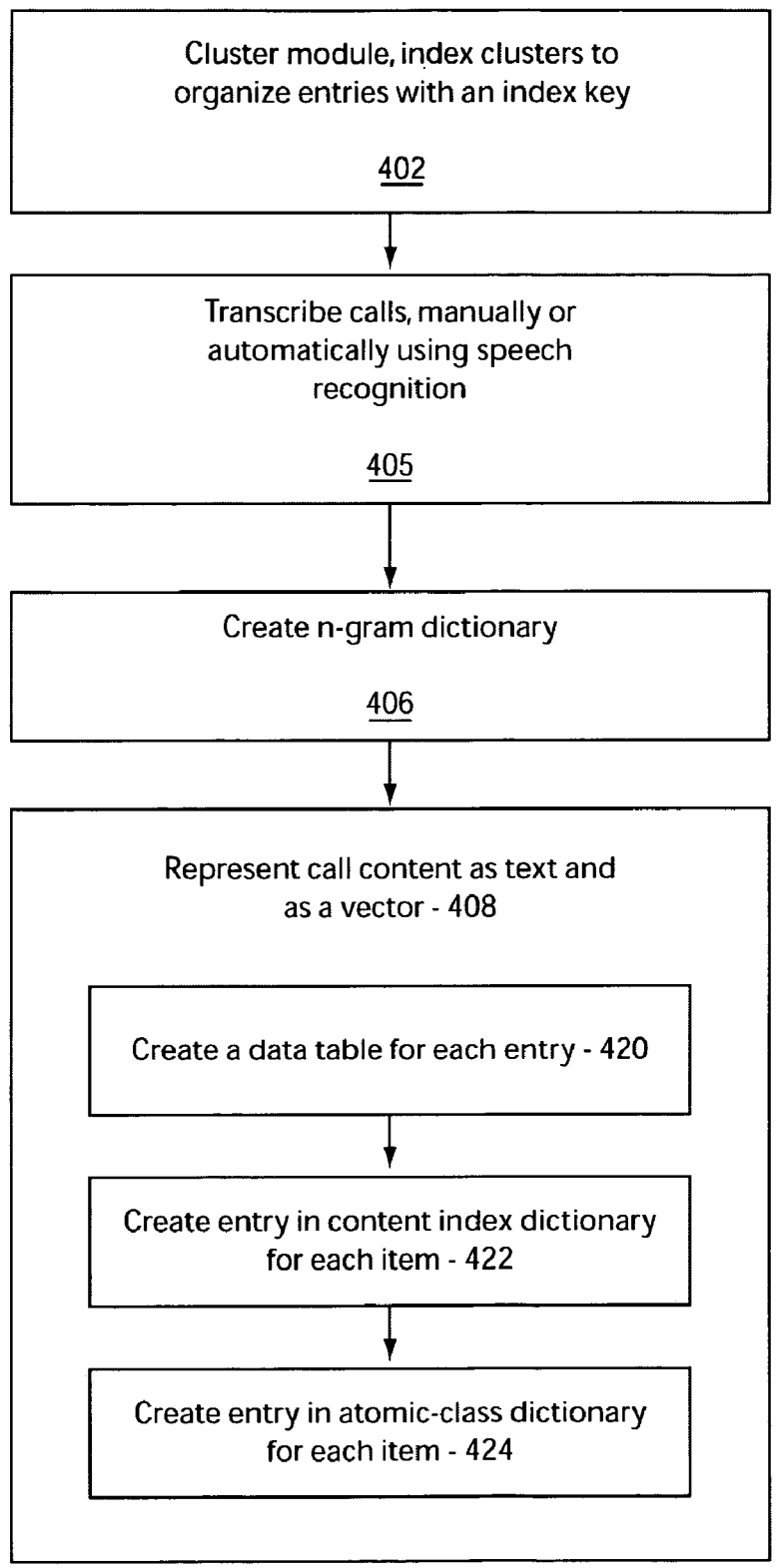
FIG. 4 is a block/flow diagram showing a system/method for operation of the management tool/module of FIG. 3.

Referring to FIG. 4, a block/flow diagram describes operation of tool 220 in an illustrative embodiment. Tool 220 employs index clustering. Index clustering is performed by a clustering module 402. Index clustering provides that data under a record in database 222 is organized based on an index key. This creates a hierarchical structure since categories and subcategories may be employed based on the index key magnitudes and place value.

In block 404, each recorded call is transcribed to text by a human transcriber, or an automatic speech recognition server 405. An n-gram dictionary 406 is created by combining all unique words (unigrams) and phrases (n-grams) as well as the frequency of each word and phrase. Here, the frequency means how often a particular word or phrase appears in the whole recorded call set.

The content of a call is represented by both text and an integer vector in a high-dimensionality vector space after ignoring all stop words, in block 408. Based on an integer vector, the system can easily find the corresponding words or phrases with their frequencies from the dictionary. Since each call has been represented by a vector, it is simple to automatically cluster all the recorded calls into destination classes with a hierarchical structure by using various distance metrics and clustering algorithms, such as, for example, Maximum Entropy, Support Vector Machine, etc.

To demonstrate the following example is presented. A call with transcription "I need a shipping label" is described.

First, a data table is created 420 for a call recording and is established in the database. The fields of indices may include:

call ID (e.g., a combination of phone numbers and dates, which are linked to an audio file), call content (transcription of a call in text), confidence score (confidence to transcription produced, range from 0-1, (1 is manually transcribed), call vector (integer numbers to describe the call content, only non-zero elements are to be stored), atomic class ID (an integer to represent the class which a call belongs to), destination agents (dispositions of call center agents to handle this call), data attribute (training/testing).

Table 1 illustratively shows a data table for a call.

TABLE 1

| Call ID | Call content | Score | Call vector | Atomic class ID | Destination Agent position | Data attribute |
|---------|--------------|-------|-------------|-----------------|----------------------------|----------------|
| 9143564529098 | Need shipping label | 0.67 | 65 78 | 89 | 9 30 | train |

Next, a dictionary of the content index has a single entry entered for each item in block 422, and each item is a word or phrase/frequency value (counter) pair. The frequency value (counter) of a word or phrase will be automatically updated when a new call is added into database.

The fields of indices content index may include a vector element corresponding to a word/phrase, a word/phrase entry (original word/phrase) and frequency (e.g., the count of this word/phrase appearing in this data set so far, updated as the same word/phrase grows).

Table 2 shows an illustrative example of a content index table/entry.

TABLE 2

| Content index | Key Word/phrase | Frequency/count |
|---------------|-----------------|-----------------|
| 65 | Need | 500 |
| 78 | Shipping label | 439 |

Atomic-class is then defined as the smallest group of sentences with certain similarity. A dictionary of atomic-class 424 has a single entry for each class, and each class is described as a combination of keywords or meaning, a parent's class hierarchy tree, central vector and the number of vectors belonging to this atomic-class. The entry index can be easily remapped to have a new atomic-class or parent's class without changing the actual atomic-class ID of a call in database.

The fields of indices for the atomic-class entry may include: entry index (atomic-class ID), key word/phrase (best description of the class with these words/phrases), parent class tree (shows the hierarchy of classification and updates as the number of calls in database grows), number of vector in class (e.g., the number of calls belonging to this class), central vector (is a geometric representation of this class and is updated as the number of calls in database grows). Table 3 illustratively shows an atomic class entry.

TABLE 3

| Atomic Class Entry index | Key words/ meaning | Parent class hierarchy tree | No. of vectors in class | Central Vector |
|---|---|---|---|---|
| 89 | Need shipping label, | 5 | 50 | V(j, k + 1) |

Figure 5:
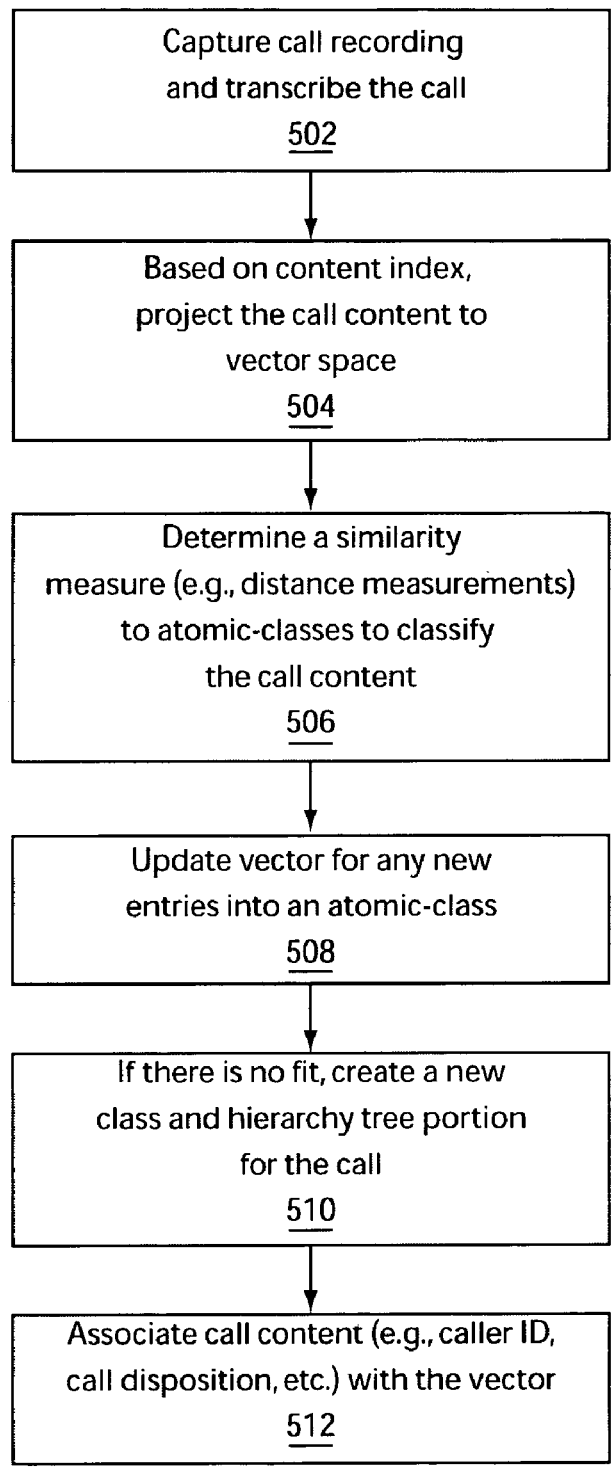
FIG. 5 is a block/flow diagram showing an illustrative example for processing a call in accordance with another embodiment.

Referring to FIG. 5, a method for automatically classifying a call recording based on embodiments of the present invention is illustratively shown.

In block 502, a call recording captured in a call center operation is transcribed to text manually or automatically, e.g. the transcribed text is "I need a shipping label." In block 504, based on the content index dictionary, the above text sentence is projected to vector space, the text =Vnew {0 . . . 65, . . . 78 . . . 0}, all stop words are filtered out. In block 506, to automatically classify this sentence, it is needed to perform the similarity measurement for this coming sentence. Assuming there are N atomic-classes for this data set so far, each of them has a central vector V1 . . . Vn, respectively. For each atomic class, the central distance vector may be defined as $$V(j,k) = \Sigma(wi*Xi)/(\Sigma wi),$$

where Xi is the vector of a sentence inside this atomic class, and wi is its weight.

A distance measurement is applied to Vnew against all the N atomic-classes. Assuming the final result shows that Vnew should belong to atomic-class Vj based on a pre-set threshold, as shown from the atomic class dictionary, j=89 and the number of sentences in this atomic class N=50.

If a call recording comes with the assigned call destination (agent position, which is one attribute in a record), the Vnew is subjected to check call destination (parent class) in compliance with other vectors in the same atomic-class. It is needed to make sure that all the vectors (call recordings) in the same atomic-class have the same call destination. If not Vnew needs to look for next closest atomic-class.

In block 508, since a new sentence Vnew just joined into this atomic class, it's V(j,k) should be updated as:

$$V(j,k+1) = ((\Sigma wi*V(j,k) + Vnew*Wnew)/(\Sigma wi + Wnew),$$

Where Wnew is the weight for Vnew
(weight Wi is used here to adjust the impact of input of a sentence vector Vi in an atomic class)

Based on a designed classification scheme, it is easy to calculate the hierarchy tree of its parents classes for atomic class 89, this hierarchy tree can be updated based on updated V(j, k+1), so the mapping of classes for the whole data set can be dynamically adjusted without touching the original recording in the database. The whole hierarchy for atomic class 89 as shown above is 5-89.

In block 510, if the distance measure of a new vector Vnew against all existing atomic classes fails to satisfy pre-set thresholds a new atomic class will be created as well as its hierarchy tree.

The sample sentence can be classified to atomic class 89 (need shipping label) and parent class 5 (e.g., order supply). The above processing of a call recording can also be done by using other classification algorithms, if appropriate. Based on above information, a database record for the call recording can be created.

In block 512, call control data is associated with the call content vector. Call data may include, e.g., Caller ID, Call disposition, etc. or other data associated with a call. This association may permit cross-referencing between a call recording and the vector created for the call to permit searching.

Having described preferred embodiments of a system and method for management of call data using a vector based model and relational data structure (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for representing call content in a searchable database, comprising the steps of:
   transcribing call content of a call to text;
   projecting the call content to vector space, wherein projecting comprises creating a call vector representative of the call content by indexing the call content using a content index dictionary;
   determining a similarity measure for the call vector in relation to classes of an atomic-class dictionary which provides classification hierarchy descriptions of call data stored in a relational database; and
   classifying the call content in the relational database in accordance with similarity measure for the call vector.

2. The method as recited in claim 1, wherein indexing the call based on the content includes indexing the content based upon at least one of n-grams, unigrams and word/phrase frequency when compared with a content index dictionary.

3. The method as recited in claim 1, wherein the step of determining a similarity includes computing a distance measurement between centers of atomic classes and the call to determine the similarity to one of the classes.

4. The method as recited in claim 3, wherein the step of classifying includes comparing the distance measurement to a threshold, if the threshold is exceeded, creating a new atomic-class for the call content.

5. The method as recited in claim 3, wherein the step of classifying includes comparing the distance measurement to a threshold, if the threshold is not exceeded, determining whether a call destination match exists.

6. The method as recited in claim 5, wherein if a call destination match exists, taking the call destination class as a parent class and classifying the call in a nearby atomic-class of this parent class.

7. The method as recited in claim 1, wherein the step of classifying includes placing a recording of the call in an atomic class having a best similarity.

8. The method as recited in claim 1, further comprising the step of searching the relational database to satisfy a query.

9. The method as recited in claim 1, further comprising the step of associating call control data with the call content vector.

10. A program storage device readable by machine, tangibly embodying a program of instructions executable by the machine to perform method steps for representing call content in a searchable database as recited in claim 1.

11. A method for representing call content in a searchable database, comprising the steps of:
 collecting incoming calls from source channels;
 transcribing content of the incoming calls;
 classifying the call content using a vector space model which represents the call content in vector space; and
 storing the call content represented by a vector in a relational data set structure to a target database,
 wherein classifying the call content comprises:
  projecting the call content to vector space, wherein projecting comprises creating a call vector representative of the call content for each call by indexing associated call content using a content index dictionary; and
  determining a similarity measure for each call vector in relation to classes of an atomic-class dictionary, which provides classification hierarchy descriptions of call data stored in a relational database.

12. The method as recited in claim 11, wherein the relational data set structure employs database call records and the content index dictionary and the atomic-class dictionary for representing a call by using the vector space model.

13. The method as recited in claim 11, wherein the classifying includes indexing the content based upon at least one of n-grams, unigrams and word/phrase frequency when compared with a content index dictionary.

14. The method as recited in claim 11, wherein the classifying includes computing a distance measurement between centers of atomic classes and the content to determine a similarity to one of the classes.

15. The method as recited in claim 14, wherein the step of classifying includes comparing the distance measurement to a threshold, if the threshold is exceeded, creating a new atomic-class for the call content.

16. The method as recited in claim 14, wherein the step of classifying includes comparing the distance measurement to a threshold, if the threshold is not exceeded, determining whether a call destination match exists.

17. The method as recited in claim 16, wherein if a call destination match exists, taking the call destination class as a parent class and classifying the call in a nearby atomic-class of this parent class.

18. The method as recited in claim 11, further comprising the step of searching the target database to satisfy a query.

19. A program storage device readable by machine, tangibly embodying a program of instructions executable by the machine to perform method steps for representing call content in a searchable database as recited in claim 11.

20. A system for representing call content in a searchable database, comprising:
 a management module, which receives, call content from a source, the management module farther comprising:
  a relational data structure employed for indexing call content and classifying call content for converting the call content into a vector;
  a content index dictionary which provides information for creating the call content indexing; and
  an atomic-class dictionary which is employed to classify the call content; and
 a database which stores the converted vectors to provide searchable call content.

21. The system as recited in claim 20, further comprising a transcription means which converts the call content to text.

* * * * *